United States Patent [19]
Fujioka et al.

[11] Patent Number: 5,286,962
[45] Date of Patent: Feb. 15, 1994

[54] IC CARD FOR PREVENTION OF FRAUDULENT USE

[75] Inventors: Shuzo Fujioka; Kenichi Takahira, both of Itami, Japan

[73] Assignee: Mitsubishi Denki Kabushiki Kaisha, Tokyo, Japan

[21] Appl. No.: 795,764

[22] Filed: Nov. 21, 1991

[30] Foreign Application Priority Data

Dec. 14, 1990 [JP] Japan .................. 2-402220

[51] Int. Cl.⁵ .................. G06K 5/02; G06K 9/03
[52] U.S. Cl. .................. 235/492; 235/380
[58] Field of Search .............. 235/492, 437, 380, 382; 364/200 MS File, 900 MS File, 221.7, 237; 371/15.1, 16.5

[56] References Cited

U.S. PATENT DOCUMENTS

| | | | |
|---|---|---|---|
| 4,798,941 | 1/1989 | Watanabe | 235/492 |
| 4,845,717 | 7/1989 | Iijima | 235/437 |
| 5,146,068 | 9/1992 | Ugawa et al. | 235/441 |
| 5,159,183 | 10/1992 | Yamaguchi | 235/492 |

FOREIGN PATENT DOCUMENTS

2-216595  8/1990  Japan .

OTHER PUBLICATIONS

Nikkei Electronics, No. 404, pp. 133-144, Sep. 22, 1986.

*Primary Examiner*—Edward P. Westin
*Assistant Examiner*—S. B. Allen
*Attorney, Agent, or Firm*—Oblon, Spivak, McClelland, Maier & Neustadt

[57] ABSTRACT

Disclosed herein is an IC card provided with means for generating a first signal indicating execution to a test program and a logic circuit for receiving the first signal and a second signal for commanding data writing in the prescribed region of the memory. The logic circuit allows output of the second signal during execution of the test program, and inhibits such output of the second signal ween an application program is executed. The IC card is so structured that a prescribed region of a memory is brought into read-only state during execution of an application program so that the IC card is identified with read data, thereby preventing fraudulent use of the IC card.

11 Claims, 6 Drawing Sheets

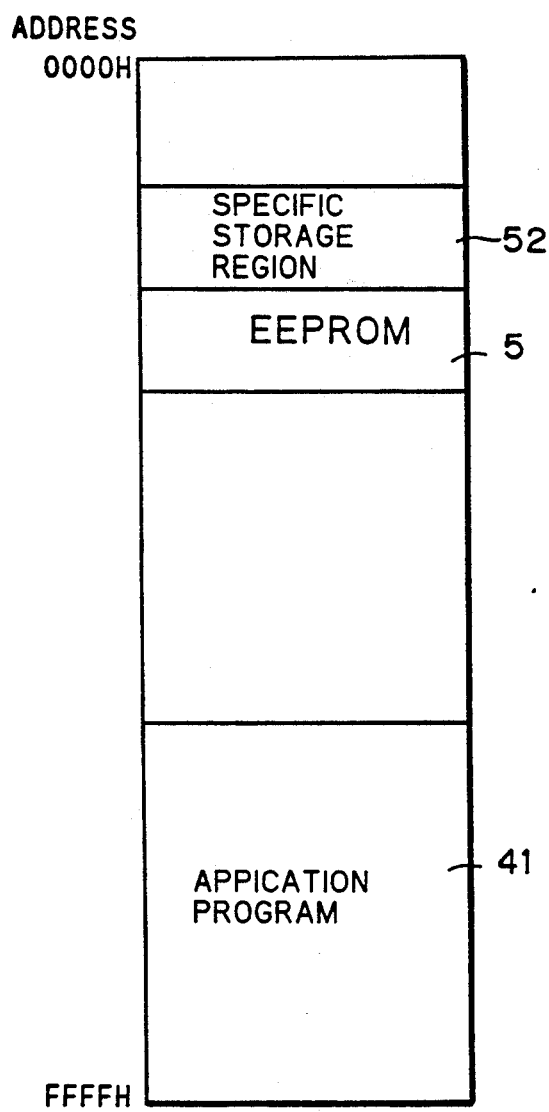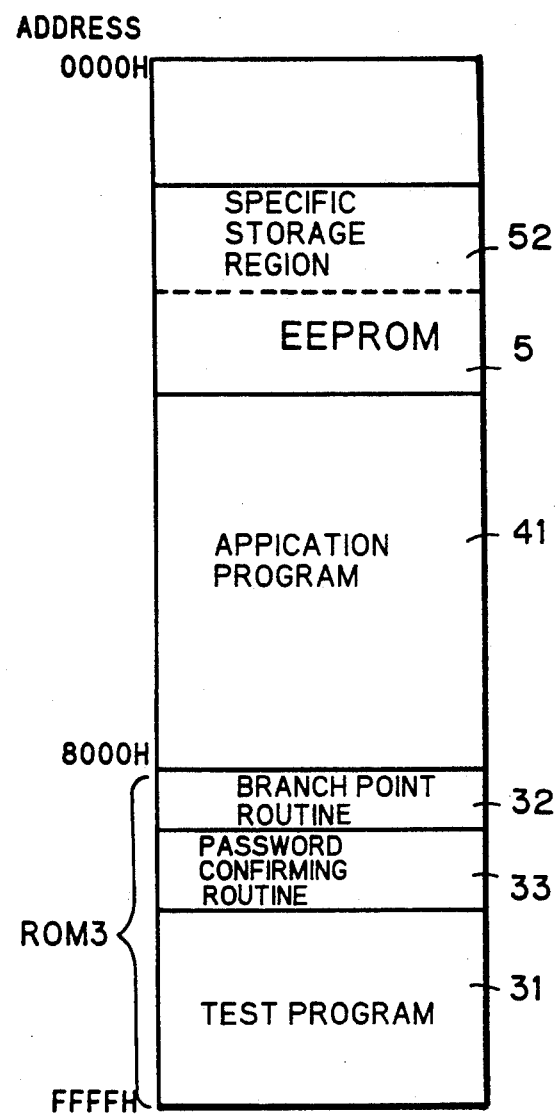

IC CARD FOR PREVENTION OF FRAUDULENT USE

BACKGROUND OF THE INVENTION

1. Field of the Invention

The present invention relates to an IC card, and more specifically, it relates to an IC card which stores a test program and an application program.

2. Description of the Background Art

FIG. 4 is a block diagram showing the structure of a conventional IC card 10. This IC card 10 contains a bus 2, and ROMs 3 and 4 for storing invariant data, an EEPROM 5 for storing variable data, a RAM 6 for temporarily storing data, and an input/output circuit 7 for inputting/outputting data in relation to an external apparatus, which are connected with each other through the bus 2.

The ROM 3 stores a test program for the maker of the IC card 10 for testing the operation of the internal circuit, and the ROM 3 stores an application program for the user for executing various functions. The EEPROM 5 is provided with a test storage region 51 storing passwords, which is accessible only when the test program is executed.

The IC card 10 is provided with a positive power input terminal P1, a power earthing terminal P2, a reset signal terminal P3 for receiving a reset signal for initializing a CPU 1, a clock terminal P4 for receiving a clock signal, and an I/O terminal P5 for inputting/outputting data.

FIG. 5 is an explanatory diagram showing procedures for starting execution of application and test programs. The CPU 1 executes processing 300 by a test program 31 and processing 400 by an application program 41, and the processing 300 by the test program 31 includes a branch point routine 32 and a password confirming routine 33, in addition to the test program 31.

FIGS. 6A and 6B are conceptual diagrams showing memory maps during execution the application and test programs 41 and 31 respectively. The memory map shown in FIG. 6A, which is in execution of the application program 41, is provided with the EEPROM 5 and the application program 41. On the other hand, the memory map shown in FIG. 6B, which is in execution of the test program 31, is provided with the test storage region 51, the EEPROM 5, the application program 41, the branch point routine 32, the password confirming routine 33 and the test program 31.

During execution of the application program 41, it is impossible to read/write data from/in the test storage region 51 by the application program 41 since the memory map is so provided that the test storage region 51 is hidden by hardware.

The operation of this IC card 10 is now described with reference to FIG. 5, showing the procedures for executing the programs. When a reset signal is inputted in the reset signal terminal P3, the CPU 1 reads out an execution starting address for the branch point routine 32 from a prescribed address of the ROM 3, to start execution of the branch point routine 32 from this execution starting address. Transition from the branch point routine 32 to the password confirming routine 33 takes place when an execution command for the test program 31 is inputted in the I/O terminal P5 from the external apparatus.

The password confirming routine 33 checks a password which is supplied from the external apparatus to the I/O terminal P5 with that stored in the test storage region 51, to execute the test program 31 upon matching, while interrupting execution of the test program 31 upon mismatching.

This test program 31 is executed by the memory map shown in FIG. 6B. When the test storage region 51 stores no password, therefore, the supplied password is checked with a dummy password which is written in the test program 31.

In order to make a decision as to whether or not the test storage region 61 stores a password, data whose discipline is different from that of initial data upon fabrication of the IC card 10 is stored in the EEPROM 5, to confirm whether or not the password to be checked matches with the stored data.

The test program 31 is provided with a function which can access a prescribed address for enabling a sufficient product test, so that the CPU accesses each address in accordance with the test program 31, thereby performing the product test.

When no execution command for the test program 31 is supplied to the I/O terminal P5, an execution starting address for the application program 41, which is previously stored in a prescribed address of the ROM 4, is read for starting execution of the application program 41 from this execution starting address.

As shown in FIG. 6A, it is impossible to read/write data from/in the test storage region 51 during execution of the application program 41. Thus, the content of the test program 31 is protected even if the application program 41 runs away.

When the IC card 10 is connected with the external apparatus as described above to be driven as a system, the test storage region 51 is not accessible during execution of the application program 41. Therefore, the external apparatus cannot read data from the test storage region 51 to identity the IC card 10 which is connected therewith. Thus, when the IC card 10 is duplicated by decoding and executing the application program 41 for rewriting the content of the EEPROM 5, it may be possible to fraudulently use the IC card 10.

SUMMARY OF THE INVENTION

In consideration of the aforementioned problem, an object of the present invention is to provide an IC card, which cannot be fraudulently used even if the same is passed into another's possession.

An IC card according to the present invention comprises means for generating a first signal indicating execution of a test program, and means for receiving the first signal and a second signal for commanding data writing to a prescribed region of a memory for allowing output of the second signal during input of the first signal while inhibiting output of the second signal during no input of the first signal.

The first signal is generated during execution of the test program. When the second signal for commanding data writing in a prescribed region of the memory is received during generation of the first signal, data writing is allowed in relation to the prescribed region of the memory.

On the other hand, no first signal is generated during execution of an application program. Even if the second signal is supplied during no generation of the first signal, no data writing is allowed in relation to the prescribed region of the memory. Thus, even if the inventive IC card storing an application program is passed into another's possession before or after issuance thereof, no data can be written in the prescribed region of the memory.

Thus, it is possible to prevent fraudulent use of the IC card, by making the same to be identified with data, which is read from the prescribed region of the memory, for executing the application program.

According to the present invention, as hereinabove described, no data can be written in the prescribed region of the memory during execution of the application program, even if a third party takes possession of the IC card. Therefore, it is possible to prevent fraudulent execution of the application program since the IC card must be identified with data which is read from the prescribed region of the memory. Thus, the present invention can effectively provide a safe and excellent IC card, which will not be fraudulently used.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2A and 2B are conceptual diagrams showing memory maps during execution of an application program and a test program of the inventive IC card respectively;

DESCRIPTION OF THE PREFERRED EMBODIMENT

Figure 1:
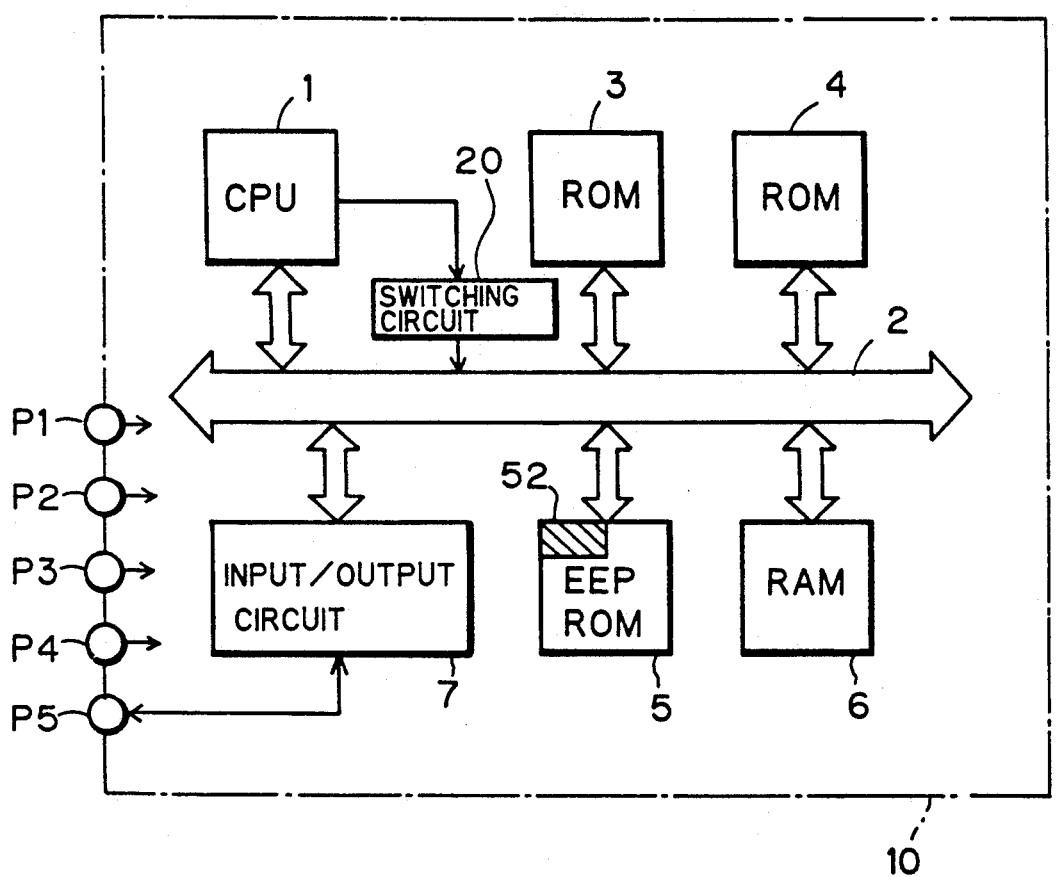
FIG. 1 is a block conceptual diagram showing the structure of an IC card according to an embodiment of the present invention.

An embodiment of the present invention is now described with reference to the drawings. FIG. 1 is a block diagram showing the structure of an IC card 10 according to an embodiment of the present invention. This IC card 10 contains a bus 2, and ROMs 3 and 4 for storing invariant data, an EEPROM 5 for storing variable data, a RAM 6 for temporarily storing data, and an input/output circuit 7 for inputting/outputting data in relation to an external apparatus, which are connected with each other through the bus 2.

The ROM 3 stores a test program for the maker of this IC card 10 for testing the operation of the internal circuit, and the ROM 4 stores an application program for the user for executing various functions. The EEPROM 5 is provided with a specific storage region 52 storing an identification code of the maker, which is readable and writable during execution of the test program but enters a read-only state when the application program is executed.

The IC card 10 is provided with a positive power input terminal P1, a power earthing terminal P2, a reset signal terminal P3 for receiving a reset signal for initializing a CPU 1, a clock terminal P4 for receiving a clock signal, and an I/O terminal P5 for inputting/outputting data.

A switching circuit 20 is interposed between the CPU 1 and the bus 2, as hereinafter described in detail. This switching circuit 20 is adapted to incorporate a test signal, a write signal and an address switching signal which are outputted from the CPU 1, to invalidate the write signal or fix the address switching signal on the basis of the test signal.

A test signal ST which is outputted from the CPU 1 enters a high level "1" when a reset signal is inputted, while the same enters a low level "0" when the application program is executed. A procedure before starting execution of the test program is similar to that shown in FIG. 5.

FIGS. 2A and 2B are conceptual diagrams showing memory maps during execution of an application program 41 and a test program 31 of the inventive IC card 10 respectively.

During execution of the application program 41, the memory map is provided with the EEPROM 5, the specific storage region 52 of the EEPROM 5, from which no data can be read during such execution of the application program 41, and the application program 41 for the user for executing various functions, as shown in FIG. 2A.

During execution of the test program 31, on the other hand, the memory map is provided with the specific storage region 52 enabling reading/writing of data during such execution of the test program 31, the EEPROM 5, the application program 41, a branch point routine 32, a password confirming routine 33, and the test program 31.

Symbols 0000H, 8000H and FFFFH denote addresses, and symbol H indicates hexadecimals.

Figure 3:
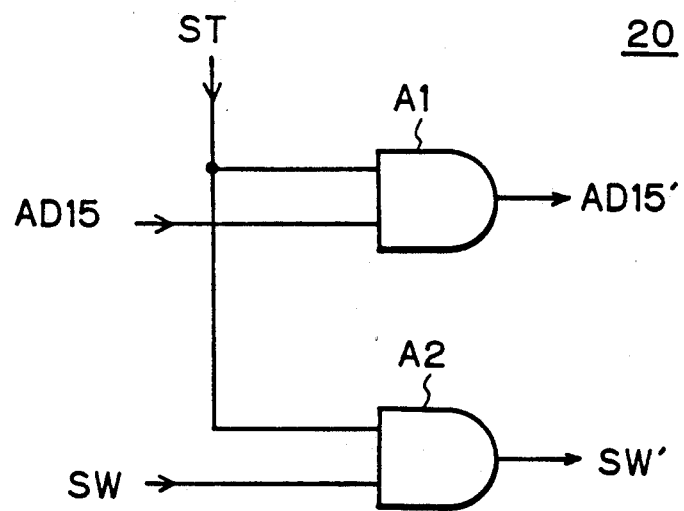
FIG. 3 is a circuit diagram showing a switching circuit for switching between execution of the test program and that of the application program.
Figure 4:
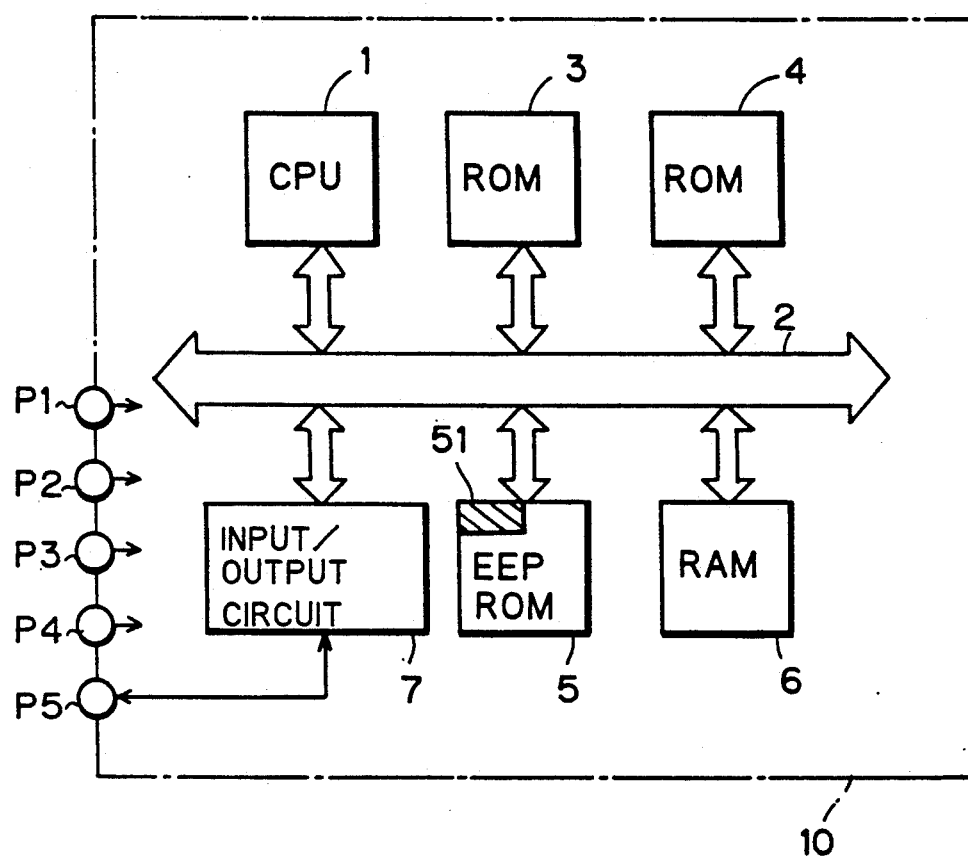
FIG. 4 is a block diagram showing the structure of a conventional IC card.

FIG. 3 is a circuit diagram showing a switching circuit 20 for switching between the memory map in execution of the test program 31 and that in execution of the application program 41. As shown in FIG. 3, the test signal ST outputted from the CPU 1 is supplied to first input terminals of AND circuits A1 and A2.

A map switching signal AD15, which is a most significant address bit signal for switching to the memory map in execution of the test program 31, is supplied to the second input terminal of the AND circuit A1, which in turn outputs the received map switching signal AD15 directly as a map switching signal AD15' when a high-level test signal ST is inputted for commanding execution of the test program 31. A write signal SW for commanding writing of data in the specific storage region 52 is inputted in the second input terminal of the AND circuit A2. When the high-level test signal ST is inputted, the AND circuit A2 outputs the received write signal SW as a write signal SW'.

Figure 6A:
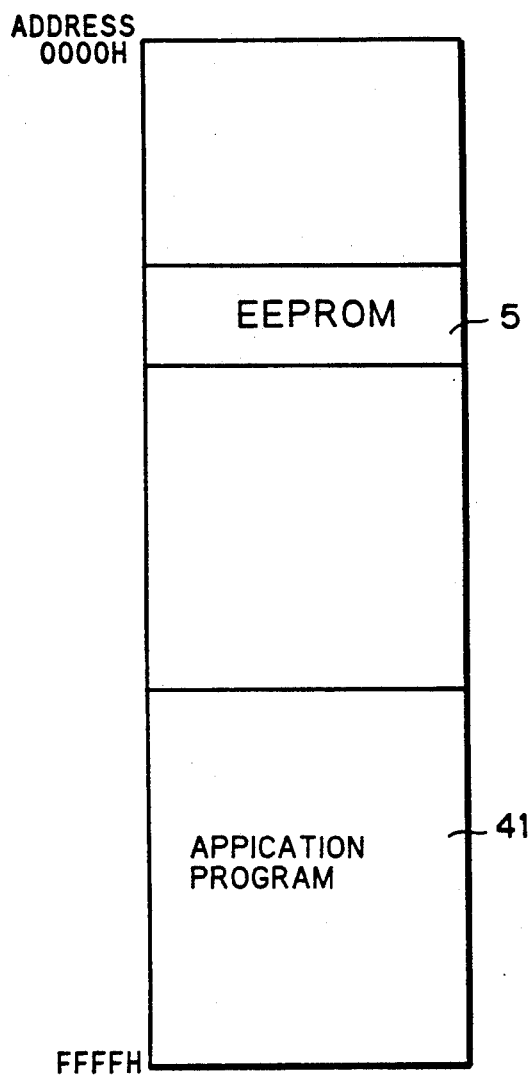
FIGS. 6A and 6B are conceptual diagrams showing memory maps during execution of an application program and a test program in the conventional IC card respectively.
Figure 6B:
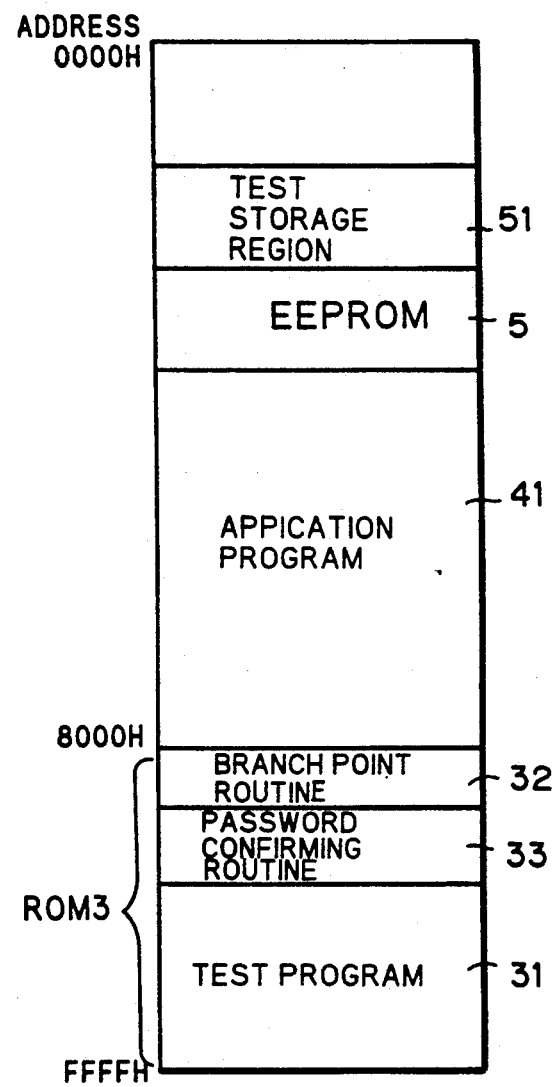

Since the memory map (FIG. 2B) executing the test program 31 is provided with no test storage region 51 dissimilarly to that shown in FIG. 6B, passwords to be checked in the password confirming routine 33 are previously written in the test program 31.

Figure 5:
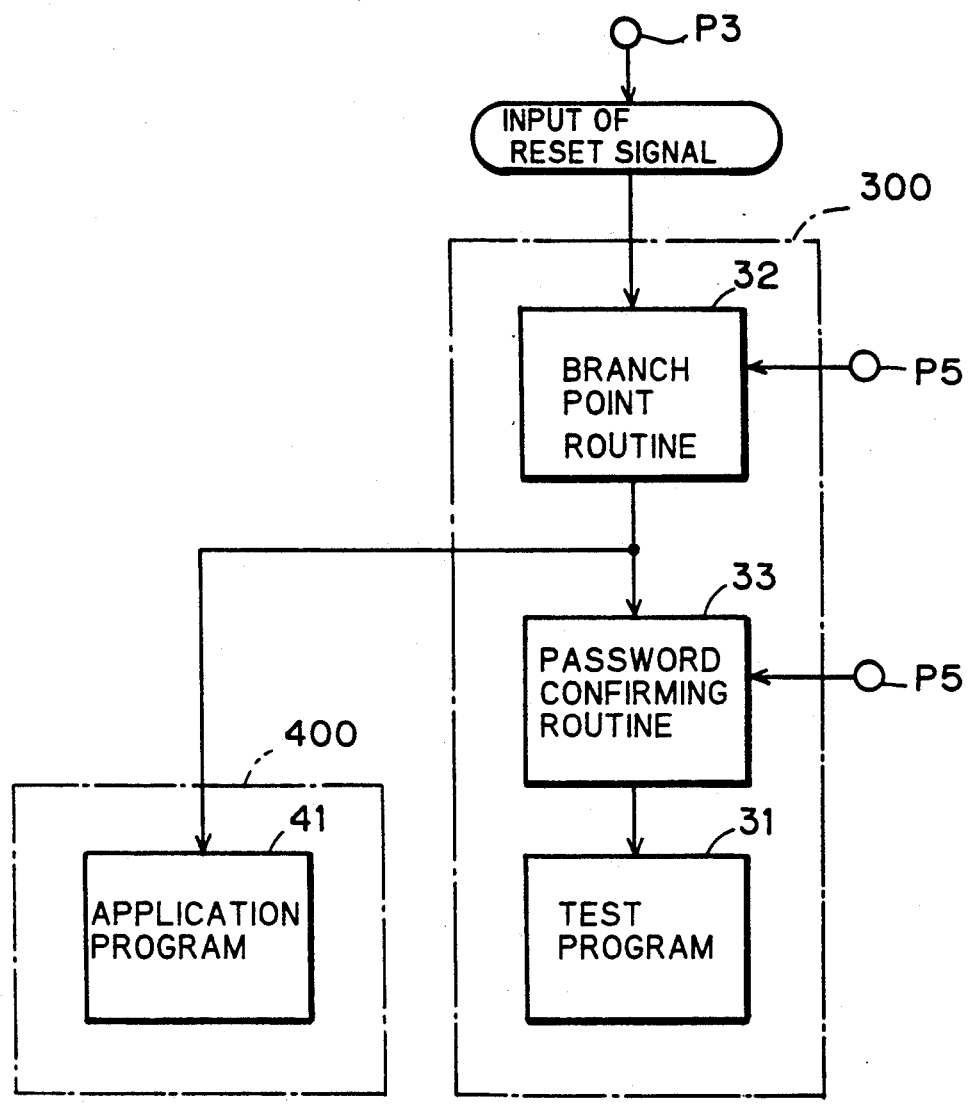
FIG. 5 is an explanatory diagram showing procedures for starting execution of an application program and a test program respectively.

The operation of the IC card 10 having the aforementioned structure is now described with reference to FIGS. 1 and 5. When a reset signal is received through the reset signal terminal P3, the CPU 1 reads out an execution starting address for the branch point routine 32 from a prescribed address of the ROM 3, to start execution of the branch point routine 32 from the execution starting address. At this time, the test signal ST which is outputted from the CPU 1 goes high level.

When an execution command for the test program 31 is inputted in the I/O terminal P5 from the external apparatus, transition from the branch point routine 32 to the password confirming routine 33 takes place so that the password confirming routine 33 checks a password which is supplied from the I/O terminal P5 with the test program password which is stored in the test program 31, to execute the test program 31 upon matching. In shipment of the IC card 10, on the other hand, an application program password such as a manufacturer code, for example, for identifying the IC card 10 for execution of the application program 41 is written in the specific storage region 52.

Such an operation is performed in the memory map in execution of the test program 31, as shown in FIG. 2B. Since the test signal ST is at a high level "1" during execution of the test program 31, the map switching signal AD15' outputted from the CPU 1 is employed for data reading in the original value of the map switching signal AD15. The write signal SW' for commanding data writing in the specific storage region 52 is also outputted similarly to the map switching signal AD15'.

When transition to execution of the application program 41 takes place, the test signal enters a low level "0", whereby the map switching signal AD15', which is the most significant address bit signal, outputted from the AND circuit A1 is fixed at a low level. Therefore, storage contents of the addresses 8000H to FFFFH are hidden and the memory map in execution of the application program 41 enters the state shown in FIG. 2A. Even if a write signal SW for commanding data writing to the specific storage region 52 is inputted in the AND circuit A2, the write signal SW' is fixed at a low level and hence it is impossible to write data in the specific storage region 52.

Thus, the specific storage region 52 enters a read-only state during execution of the application program 41, so that no data can be written in the specific storage region 52 even if a third party takes possession of the IC card 10 and tries to fraudulently use the same by decoding the application program 41. Therefore, it is possible to hinder execution of the application program 41 for preventing fraudulent use of the IC card 10 since the IC card 10 must be identified with data which is read from the specific storage region 52 for executing the application program 41, thereby ensuring safety of the IC card 10.

Although the specific storage region 52 is provided in the EEPROM 5 in the aforementioned embodiment, the same can alternatively be provided in the RAM 6, which is backed up with a battery.

When the test storage region 51 described with reference to the conventional IC card is combined with the specific storage region 52, it is possible to further reliably protect the application program 41 thereby further reliably preventing fraudulent use of the IC card 10.

When curriculum data such as the production number and the production stage of the IC card 10 etc. are written in the specific storage region 52, in which no data can be written afterwards, it is possible to trace the IC card 10 even if data are broken in the EEPROM 5 by a failure of the application program 41.

Although the test signal ST outputted from the CPU 1 enters a high level "1" upon input of the reset signal while the same enters a low level "0" upon transition to execution of the application program 41 in the aforementioned embodiment, the same may regularly remain at a low level, to enter a high level when a signal received through the I/O terminal P5 in execution of the password confirming routine 33 commands execution of the test program 31.

While the invention has been shown and described in detail, the foregoing description is in all aspects illustrative and not restrictive. It is therefore understood that numerous modifications and variations can be devised without departing from the scope of the invention.

What is claimed is:

1. An IC card, comprising:
   a CPU for outputting a test signal entering an active state in execution of a test program;
   a first storage part storing said test program;
   a second storage part storing an application program;
   a readable and writable third storage part provided with at least a region for storing a code being specific to said IC card; and
   switching means for receiving said test signal for bringing said third storage part into a readable and unwritable state when said test signal is in an inactive state.

2. An IC card in accordance with claim 1, further comprising
   a reset signal terminal for receiving a reset signal for initializing said CPU, wherein
   said test signal being outputted from said CPU enters an active state when said reset signal is received, while the same enters an inactive state when said application program is executed.

3. An IC card in accordance with claim 1, further comprising
   a data input/output terminal for data input/output in relation to an external apparatus, for receiving a test command signal commanding execution/non-execution of said test program, wherein
   said CPU brings said test signal into an active state only when said test command signal commands execution of said test program.

4. An IC card in accordance with claim 2, wherein said first and second storage parts are first and second ROMs respectively.

5. An IC card in accordance with claim 2, wherein said third storage part is an EEPROM.

6. An IC card in accordance with claim 2, wherein said third storage part has a backup function of a battery.

7. An IC card in accordance with claim 2, further comprising:
   a data input/output terminal for data input/output with respect to an external apparatus,
   an input/output circuit for transferring data between the same and said data input/output terminal, and
   a bus connected with said CPU, said first to third storage parts and said input/output circuit for enabling data transfer between said CPU, said first to third storage parts and said input/output circuit.

8. An IC card in accordance with claim 7, further comprising a fourth storage part connected with said bus for temporarily preserving data.

9. An IC card in accordance with claim 8, wherein said fourth storage part is a RAM.

10. An IC card in accordance with claim 8, further comprising:
    a positive power input terminal,
    a power earthing terminal for inputting a ground potential, and
    a clock terminal for inputting a clock signal.

11. An IC card in accordance with claim 10, wherein said application program can be executed only when said code being stored in said third storage part is at a prescribed value.

* * * * *